May 23, 1950 W. H. COLBERT ET AL 2,508,858
MIRROR HAVING A STRONGLY ADHERENT METALLIC COATING
Original Filed June 24, 1944

INVENTORS
William H. Colbert
Arthur R. Weinrich
Willard L. Morgan
BY Corbett, Mahoney + Miller
ATTORNEYS Patented May 23, 1950

2,508,858

UNITED STATES PATENT OFFICE 2,508,858

MIRROR HAVING A STRONGLY ADHERENT METALLIC COATING

William H. Colbert, Brackenridge, Pa., Willard L. Morgan, Columbus, Ohio, and Arthur R. Weinrich, Brackenridge, Pa., assignors to Libbey-Owens-Ford Glass Company, Toledo, Ohio, a corporation of Ohio Original application June 24, 1944, Serial No. 541,964. Divided and this application March 21, 1945, Serial No. 583,927

4 Claims. (Cl. 88—105)

This invention relates to mirror having a strongly adherent metallic coating. It comprises a means of securing a high degree of adhesion of metallic or reflective coatings to glass, porcelain, silica, mica, or other silicates or silica-containing surfaces, and has to do, more particularly, with the use of an extremely thin layer of a metallic lead compound such as a metallic lead oxide, sulfide, sulfate or halide such as a chloride, bromide, iodide, or fluoride, as the adhesive in the application of reflective, photo-chemical, or other types of metallic coatings on these materials.

The present application is a division of our co-pending application Serial Number 541,964, now Patent 2,482,054.

Reflective articles such as mirrors are commonly made by the application to glass of metallic reflective materials such as copper, silver, gold, aluminum, chromium, platinum and rhodium. Most of these materials do not actually adhere to the glass and in forming mirrors such as silver mirrors the silver is not at all stuck to the glass but is merely laid closely to the surface and held to the glass in intimate contact largely by the pressure of the atmosphere. Consequently, any localized force removes the mirror layer such as aluminum, silver, copper or gold away from the surface, causing pin holes and finally "let-goes" or "blisters" throughout the mirror. In such cases the utility of the mirror is destroyed and it rapidly disintegrates. While attempts have been made in the past to protect such mirror coatings on glass from the effects of the atmosphere and more particularly from abrasion and rubbing of the mirror film off the glass, these attempts have generally followed the direction of applying a protective lacquer or shellac coating. Such coatings, or paint coatings which are also used, however, tend to contract during the drying and formation of the protective coating film and they further contract and expand with the humidity in the atmosphere. Such contractions or expansions in the protective films are sufficient to cause localized strains or pulling effects and often the use of such lacquers or other coatings, rather than resulting in an increase in the life of the mirrors, has been found to lead to an early destruction of the mirror by pulling the mirror coating away from the glass.

We propose to overcome the difficulties arising from lack of adhesion within glass or other mirrors and the similar difficulties experienced with many other coatings applied to glass for other purposes, such as metallic coatings deposited upon glass supports in order to produce photo-electric surfaces or electrical resistances. We have found that various metallic lead compounds in contrast to the metals are highly adherent to glass and that continuous, extremely thin layers of these, which are also adherent to the metal coatings to be applied to glass, can be used to secure highly adherent products, exhibiting the normally desired optical, electrical or other properties without any, or at least without serious, change.

We have found that the metallic lead oxides when applied over glass or other siliceous surfaces, are extremely highly adherent to such surfaces and that furthermore they are highly adherent to the metals which may be applied to glass either by chemical deposition, thermal evaporation, sputtering or other means, for the purposes of securing mirrors or other coated articles. In addition we have also found that other metallic lead compounds may be used as adhesive layers between a metal coating and a silica-containing surface, such as glass. Thus, the lead compounds which may be looked upon as derivatives of the lead oxides are generally highly effective and we may use the sulfide, sulfate, bromide, chloride, iodide, or other compounds related to the metallic lead oxides which we have indicated above. While with ordinary metallic mirrors the coatings can readily be removed from glass by applying adhesive tape to the same and pulling this off, it is found that with our new coated articles, the adhesive tape will not pull the mirror films away from the glass because they are so tightly adhered to the same by our intermediate thin adhesive layers. Furthermore, with the new mirrors and other coated articles, a remarkably improved resistance to moisture is found so that these will withstand, in an unprotected condition, salt spray and humidity tests for considerable periods of time, whereas with the ordinary mirrors and coated articles, the water quickly works between the mirror films and the glass on which they lie and removes the films from the glass. In a similar way the separation difficulties experienced due to tensional pull when protective lacquer, paint or shellac coatings are applied on the back of mirrors, have been overcome, since our reflective coatings are adhered sufficiently tightly to the glass to resist such tensional effects. This permits us a further advantage in that we may now apply, for the purposes of protecting mirrors from corrosive gases such as sulfides, protective coatings of a maximum resistance to atmospheric effects without regard to the coating being one free of tensional pull.

The metallic lead oxides or other metallic lead compounds applied as adhesive films need be, and in some cases preferably are, very thin, being only a few molecules thick in some cases and not visible or otherwise detectable. We have found that the thickness of layer necessary to develop adhesive forces needs to be only a few molecules thick and as such the presence of these compounds on the glass may not be detectable by any optical effect. Thus, where we use extremely thin films of lead oxides or other lead compounds for the purpose of securing highly adherent mirrors, the mirrors produced by depositing silver or other suitable metal on the glass first covered with a very thin metallic lead oxide film, are equal in reflectivity and in transmission to similar mirrors made without the very thin lead oxide or other metallic lead compound adhesive films. However, we may also use thicker lead oxide or lead compound films as an adhesive layer which may even be detected by the slight color they impart to the glass and which may also cut down the reflectivity or transmission of light to some degree in the final produced article. Thus, for example, with a mirror, it is apparent that if our adhesive layers are too thick, the reflectivity properties of a second surface mirror may be seriously or desirably cut down but at the same time it is apparent that the reflection properties of a first surface mirror made in such a way would not particularly be influenced by the thickness of the oxide or adhesion-securing layer. The metallic lead oxide or metallic lead sulfide or other metallic lead compound may be deposited as a coating on the glass by the direct thermal evaporation under normal conditions or within a vacuum, of extremely small amounts of the desired metallic lead compound. This may also be carried out in accordance with the disclosure of co-pending applications Serial Nos. 541,956 and 645,939. In the case of lead oxide layers, we may produce these in position on the glass by oxidation of extremely thin metallic lead layers first deposited thereon by thermal evaporation. Thus, we may first evaporate very small amounts of lead and then form these into the metallic lead oxides while on the glass surface. As examples of the compounds we may directly evaporate onto the glass surface by thermal evaporation within a vacuum, we may use lead oxide, lead sulfide, lead bromide, or lead tungstate. We may readily form coatings of lead sulfate on glass by first evaporating extremely small amounts of lead sulfide and thereafter oxidizing this on the glass to lead sulfate by exposure to the air.

One of the objects of our invention is to provide a reflective or a metallized surface coating which will firmly and substantially permanently adhere to a supporting surface preferably formed from glass or other siliceous material.

Another object of our invention is to provide an improved transparent, semi-transparent, or opaque coating of metallic material which will firmly and substantially permanently adhere to a support article preferably formed from glass or other siliceous material.

A further object of our invention is to provide an improved coated article support in which the metallic surface coating will adhere firmly to said article support by virtue of the provision of an interposed or intermediate film or coating of an inorganic lead compound.

Another object is to provide an improved coated article support in which the metallic surface coating will adhere firmly to said article support by virtue of the provision of an interposed or intermediate transparent film or coating of an inorganic lead compound.

A further object is to provide an improved coated article support in which a metallic surface coating will adhere firmly to said article support by means of an interposed or intermediate transparent film or coating which has no optical effect.

A further object of our invention is to provide an improved tightly adherent coating to an article formed from siliceous material so that the article will have the characteristic of being impervious to moisture and can withstand subjection to salt spray and humidity without deterioration.

The above and other objects and advantages of our invention will appear from the following description and appended claims when considered in connection with the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Figure 1:
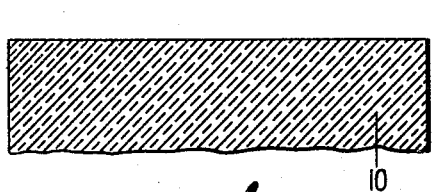
Figure 1 is a fragmentary sectional view of a piece of glass or other siliceous material.
Figure 2:
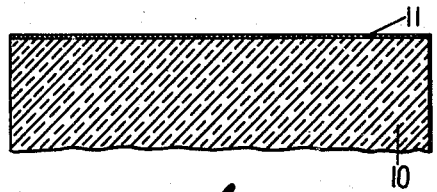
Figure 2 is a view similar to Figure 1 showing the glass or other siliceous material having a thin film or coating of a metallic lead compound.
Figure 3:
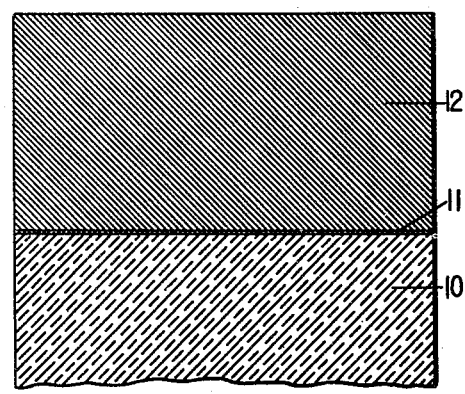
Figure 3 is a fragmentary sectional view of the article of Figure 2 having a semi-transparent reflective metallic coating or layer on its surface.

Referring now particularly to Figures 1, 2 and 3 of the drawings, there are illustrated certain steps of making one type or kind of article or object in accordance with the method or process of our invention, Figure 3 showing the article resulting from said method.

In Figure 1 we have shown a support article, such as a piece of glass or other siliceous material 10, to which a surface coating is to be applied in a manner to be described hereinafter. To one face of the support 10 there is applied a relatively thin film or coating 11 of a suitable metallic lead compound, as seen in Figure 2.

In Figure 3, a metal coating or layer 12 is shown as applied over the metallic lead compound film 11, the latter being of such a nature as to cause the coating 12 to firmly and substantially permanently adhere to the support article or piece 10. The layer or coating 12 may be in the nature of a semi-transparent reflective metallic coating, if desired. The film 11 is of such a thickness and nature as to have absolutely no optical effect or of some greater thickness where desired.

Figure 4:
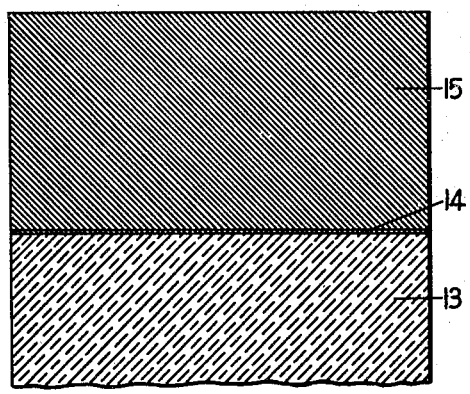
Figure 4 is a view similar to Figure 3 showing the article having an opaque metallic surface layer or coating.

In Figure 4, a support piece or base 13, such as glass, quartz, or other siliceous material, has applied to one face thereof a relatively thin film or layer 14 of a suitable inorganic lead compound over which is applied a somewhat thicker layer or coating 15 of some suitable opaque metal. The lead compound film 14 causes the coating or layer 15 to firmly adhere, substantially permanently, to the support or base 13. The film 14 may be of such a nature and thickness as to not cause any optical effect, or it may in other cases be thicker and bring optical effects with it as well as provide adhesion of the metal to the support.

Figure 5:
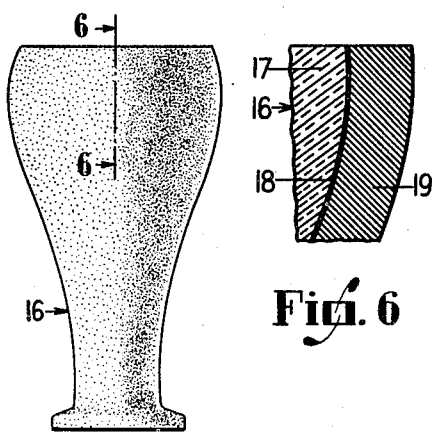
Figure 5 is an elevational view of a porcelain or earthenware article, such as a vase or the like, made in accordance with our method.
Figure 6:
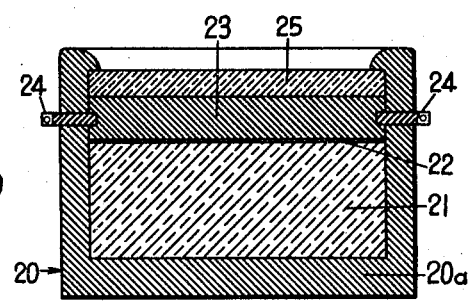
Figure 6 is a fragmentary detail sectional view taken substantially along the line 6—6 of Figure 5, looking in the direction of the arrows.

In Figures 5 and 6 we have shown the application of our novel method or process to the production of a piece of earthenware or porcelain ware having a tightly or strongly adherent coating or covering. As shown, a vase or similar article, shown as a whole at 16, has a body portion 17 which may be formed from porcelain or earthenware, preferably glazed, to the outer surface of which is applied a relatively thin film or coating 18 of a suitable metallic lead compound. Laid over this film 18 is a suitable metallic coating or covering 19 which may be partially transparent or opaque and which is caused to firmly or strongly adhere to the surface of the vase body or support article 17 so that said coating 19 will be of substantially a permanent nature.

While we have shown, merely by way of illustration, a vase 16, it will be understood that our method or process is equally applicable to the production of coated earthenware or porcelain articles or objects of various kinds, shapes and sizes.

Our improved method or process is also applicable to the production of tightly adherent coatings for various articles and devices. As an illustration, we have shown the application of the method of our invention to the production of a photo-chemical cell, as well as the resultant device or article.

Figure 7:
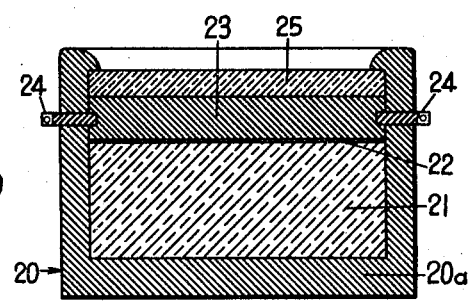
Figure 7 is a vertical sectional view of a photochemical cell made in accordance with our method and embodying the present invention.

The photo-chemical cell is shown as a whole at 20 in Figure 7. It comprises, as shown, an open top casing or housing 20a, which may be formed from plastic and within which is located a base piece or body 21 formed from glass or other siliceous material. Applied to the top face or surface of the glass piece 21 is a relatively thin film or coating 22 of a suitable metallic lead compound such, for example, as lead oxide. Laid over this film 22 and tightly adhered to the glass 21 by said film, is a layer of silver 23 with which electrical contacts or conductors 24 are associated. Overlying the silver layer 23 is a photoelectric layer 25 formed from some suitable material such, for example, as copper oxide.

Example 1

0.0082 gram of yellow lead oxide were evaporated from a tungsten filament onto a piece of glass 24 inches away within a high vacuum chamber. The lead oxide was evaporated directly in a high vacuum of about 10 to the minus 2 millimeters, or better, and gave a coating on the glass approximately 0.0002 micron thick. This coating could not be seen nor did it affect the light transmission of the glass. 8.6 grams of silver, 2.2 grams of aluminum, 7.25 grams of copper, or 5.8 grams of chromium was then thermally evaporated onto this prepared glass and in each case the first and second surface mirrors showed the normal characteristic reflection values and properties of the ordinary mirrors not having the lead oxide film. In each case, however, the mirrors were very tightly adherent, and in each of these mirrors the lead oxide film next to the glass was .0002 micron thick and the metallic reflective layers were 0.1750 micron thick.

Example 2

Using a lead oxide coated plate produced as just above, there was deposited on such a piece of glass sufficient silver to produce a coating of .04 gram per square foot and of about .040 micron thickness. This gave a semi-transparent mirror showing a reflectivity of 84% and a light transmission of 9%, which is identical with that secured in similar deposits on glass without the lead oxide coating. The silver mirror produced was tightly adherent.

Example 3

Working within a high vacuum chamber with the glass piece placed 14 inches away from the tungsten heater filaments, there was evaporated onto the glass 0.004 gram of lead which was thereafter converted into lead oxide by exposure to air. The lead film, before converting to the oxide, was about .0022 micron thick and the lead oxide film should have been about .0029 micron in thickness. When this was coated with silver by thermal evaporation sufficient to give a deposit of 0.1 gram per square foot, the second surface reflectivity of the silver mirror produced was 91%. In this case no loss in reflectivity was experienced as ordinary second surface silver mirrors produced by thermal evaporation have a reflectivity of 91% an extreme improvement in adhesion was however secured. We may also apply the silver layer by sputtering silver onto the lead oxide coated sheets. Similar results are secured if the lead oxide coated sheets are silvered or mirrored by ordinary chemical deposition methods, as by pouring an alkaline mixture of silver nitrate and invert sugar on the precoated sheets.

Example 4

Whereas the lead oxide film used in this last example was invisible, a lead oxide film similarly produced at the same distance in the same vacuum chamber by the evaporation of 0.015 gram of lead was visible as a very slight yellowish tinge upon the glass. When silver to the amount of 0.1 gram per square foot was deposited upon this coating by thermal evaporation, the reflectivity of the second surface silver mirror produced was found to be 85%. Thus, the lead oxide film which was about .0108 micron thick did in this case decrease the reflection but its use gave a tightly adherent mirror capable of standing prolonged salt spray tests. By the use of even thicker films of lead oxide there is not found any further improvement in adhesion but as the lead oxide films become thicker there is a greater absorption of light. Thus, evaporating 0.036 gram of lead and converting this into lead oxide, gave a lead oxide film of 0.0260 micron thickness and there was a distinct yellowish color produced upon the glass. When this was then coated with silver to the amount of 0.1 gram per square foot, the silver mirror produced had a reflectivity of 77%. In producing the lead oxide film in this example, the lead was preferably converted into lead oxide by operating an electric glow discharge in an oxygen or air atmosphere at .02 millimeter for about 20 minutes or the lead-coated plates may be heated a short time in an over at 100° C. or higher.

Example 5

0.010 gram of lead sulfide was evaporated in a high vacuum directly upon pieces of silica, mica, borosilicate glass, lead glass, and ordinary glass placed 24 inches away from the tungsten filament carrying the lead sulfide and upon the coated glass pieces thus secured, there showed no visible signs of any deposit. There was thermally evaporated immediately within the same vacuum upon this glass, an opaque deposit of aluminum. The first surface aluminum mirrors produced in each case showed a reflectivity of 89% and were very tightly adherent. The lead sulfide preliminary coating amounted to .0001 gram per square foot of area and was about .0003 micron thick.

Example 6

An ordinary piece of glass was coated as under the last example, but the amount of lead sulfide evaporated was .025 gram. After the evaporation, air was let into the tank and after a few moments the vacuum pumps were again started and aluminum was then thermally deposited as before. This gave a similar mirror to the last prepared glass mirror in which the aluminum was adhered to the glass by a thin film of lead sulfate formed by oxidation of the lead sulfide. The lead sulfate layer would appear to have been of about .0011 micron thickness. The oxidation of the lead sulfide layer to lead sulfate may also be accomplished without removing the piece from the vacuum chamber, by introducing air or oxygen into the chamber after the lead sulfide has been deposited, until a sufficient pressure has been built up which will permit an electric glow discharge to pass through the gases within the chamber. After a short time the electric glow discharge, in combination with the oxygen present, converts the lead sulfide to lead sulfate.

Example 7

A porcelain vase as shown in Figures 5 and 6 of the drawings was placed within a small furnace in the bottom portion of which a container carrying lead chloride was placed. The temperature of the furnace was gradually raised to bring the same to 1000° C. or slightly above. At these temperatures the lead chloride volatilizes and after the furnace was again cooled a thin coating of lead chloride condensed all over the surfaces of the bowl. The bowl was then placed in a high vacuum chamber and an opaque deposit of gold was then evaporated onto the surfaces of the bowl by thermal evaporation. The gold coating was then found to be highly adherent to the porcelain bowl whereas similar bowls coated directly with gold did not give a commercial article in that the gold soon became detached and even tended to rub off. The thin lead chloride film acts as a strong adhesive cementing the metallic gold to the siliceous porcelain surface of the bowl. Many similar articles can be produced in such ways.

Example 8

Clean glass pieces were coated with a layer of lead oxide 0.0002 micron thick as under Example 1 and other pieces were coated in another chamber with lead sulfide 0.0003 micron thick as in Example 5 by the direct thermal evaporation of these materials. In each case after these metallic compounds had been deposited on the glass by thermal evaporation there was then evaporated thereon within the respective chambers without breaking the vacuums, a reflective coating of rhodium. In contrast to similar deposits of rhodium made directly onto glass which are very poor in adhesion and undependable, our mirrors were of high adhesion and high service life. The intermediate coatings were transparent, invisible and without optical effect, the first and second surface reflectivities equalling good rhodium mirrors.

So that there can be no misunderstanding as to the use herein of the term "siliceous material," we submit below a definition of this term:

The adhesive effects are secured upon silica, silicates such as mica which contains silica, aluminum silicate or calcium silicate surfaces, and upon the various types of glass which contain different amounts of silica. Thus, with the lead glasses which have 30 to 60 per cent silica, with the optical glasses of 50 per cent silica or more, the ordinary lime glasses of around 65 to 75 per cent silica, and with the borosilicate glasses of as high as 80 per cent silica, we secure equally as good results as are found with pure silica. Likewise, the commercial porcelain and earthenware articles which contain varying amounts of silica in the ware or in the glazes provide suitable support bases to which metallic films may be adhered by use of our lead compounds.

Having thus described our invention, what we claim is:

1. A bonded mirror comprising a vitreous siliceous support body having a smooth continuous surface; a continuous intermediate lead oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a metal reflecting film permanently and directly adhered by molecular forces to said adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

2. A bonded mirror comprising a vitreous siliceous support body having a smooth continuous surface; a continuous intermediate lead oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a silver reflecting film permanently and directly adhered by molecular forces to said adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

3. A bonded mirror comprising a vitreous siliceous support body having a smooth continuous surface; a continuous intermediate lead oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a rhodium reflecting film permanently and directly adhered by molecular forces to said adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

4. A bonded second surface mirror comprising a transparent vitreous siliceous support body having a smooth continuous rear surface; a substantially transparent continuous intermediate adhesive layer composed of lead oxide permanently and directly adhered by molecular forces to the rear surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said rear surface of the support body; and a metal reflecting film permanently and directly adhered by molecular forces to said adhesive layer, the adjacent surfaces of said adhesive layer and said reflecting film being in intimate continuous surface to surface contact and defining a smooth continuous interface.

WILLIAM H. COLBERT.
WILLARD L. MORGAN.
ARTHUR R. WEINRICH.

REFERENCES CITED

The following references are of record in the file of this patent:

UNITED STATES PATENTS

| Number | Name | Date |
| --- | --- | --- |
| 1,884,665 | Greiner | Oct. 25, 1932 |
| 2,030,476 | Smith | Feb. 11, 1936 |
| 2,281,474 | Cartwright et al. | Apr. 28, 1942 |
| 2,304,182 | Lang | Dec. 8, 1942 |
| 2,394,930 | McRae | Feb. 12, 1946 |